(12) United States Patent
Becker, IV et al.

(10) Patent No.: US 8,751,591 B2
(45) Date of Patent: Jun. 10, 2014

(54) SYSTEMS AND METHODS OF ADJUSTING CONTACT IMPORTANCE FOR A COMPUTING DEVICE

(75) Inventors: Stephen Becker, IV, Seattle, WA (US); Benjamin John Turner, Seattle, WA (US)

(73) Assignee: BlackBerry Limited, Waterloo (CA)

( * ) Notice: Subject to any disclaimer, the term of this patent is extended or adjusted under 35 U.S.C. 154(b) by 273 days.

(21) Appl. No.: 13/249,561

(22) Filed: Sep. 30, 2011

(65) Prior Publication Data

US 2013/0086177 A1  Apr. 4, 2013

(51) Int. Cl.
G06F 15/16 (2006.01)

(52) U.S. Cl.
USPC ............. 709/206; 709/204; 709/223; 706/52; 707/100; 713/201

(58) Field of Classification Search
USPC ............. 709/206, 204, 223; 706/52; 707/100; 713/201
See application file for complete search history.

(56) References Cited

U.S. PATENT DOCUMENTS

| | | | |
|---|---|---|---|
| 5,428,778 A | 6/1995 | Brookes | |
| 5,724,567 A | 3/1998 | Rose et al. | |
| 5,948,058 A | 9/1999 | Kudoh et al. | |
| 6,049,777 A | 4/2000 | Sheena et al. | |
| 6,202,058 B1 | 3/2001 | Rose et al. | |
| 6,396,513 B1 | 5/2002 | Helfman et al. | |
| 6,473,752 B1 | 10/2002 | Fleming | |
| 6,480,885 B1 | 11/2002 | Olivier | |
| 6,654,791 B1 | 11/2003 | Bates et al. | |
| 6,725,228 B1 | 4/2004 | Clark et al. | |
| 6,807,558 B1 | 10/2004 | Hassett et al. | |
| 6,816,863 B2 | 11/2004 | Bates et al. | |
| 6,832,245 B1 | 12/2004 | Isaacs et al. | |
| 7,032,011 B2 | 4/2006 | Woodard et al. | |

(Continued)

FOREIGN PATENT DOCUMENTS

| | | |
|---|---|---|
| EP | 2336957 A1 | 6/2011 |
| EP | 2339480 A1 | 6/2011 |
| KR | 20020067102 | 8/2002 |

OTHER PUBLICATIONS

Asurion Mobile Address Book gives users a much richer view of their relationships by integrating status updates and dynamic content from social networks. http://www.asurionmobile.com/addressbook.html. Retrieved Aug. 9, 2011.

(Continued)

*Primary Examiner* — Michael C Lai
(74) *Attorney, Agent, or Firm* — Novak Druce Connolly Bove + Quigg LLP

(57) ABSTRACT

A list of contacts is stored in at least one contact repository such as an address book of an electronic device. Contacts can be assigned an importance value. An importance value is determined for contacts based on criteria such as the recentness that a contact's information was updated or revised, how recently the contact was added to an electronic device's address book, whether a contact's website was recently accessed by an electronic device, the identity of a contact or the nature of the relationship between a contact and an electronic device. Contact importance criteria can be set in response to selections and inputs, for example via the use of slider bar on a display. Contacts can be dynamically ranked according to their importance and a ranked list of contacts can be displayed.

17 Claims, 8 Drawing Sheets

(56) References Cited

U.S. PATENT DOCUMENTS

| | | |
|---|---|---|
| 7,039,639 B2 | 5/2006 | Brezin et al. |
| 7,082,407 B1 | 7/2006 | Bezos et al. |
| 7,162,471 B1 | 1/2007 | Knight et al. |
| 7,209,942 B1 | 4/2007 | Hori et al. |
| 7,305,470 B2 | 12/2007 | Tom et al. |
| 7,454,470 B1 | 11/2008 | Isaacs et al. |
| 7,716,217 B2 | 5/2010 | Marston et al. |
| 7,716,287 B2 | 5/2010 | Appelman et al. |
| 7,734,586 B2 | 6/2010 | Mohler et al. |
| 7,818,206 B2 | 10/2010 | Smith et al. |
| 8,140,540 B2 | 3/2012 | Chitiveli et al. |
| 8,185,492 B2 | 5/2012 | Mayers et al. |
| 8,276,079 B2 | 9/2012 | Davar et al. |
| 2002/0104080 A1 | 8/2002 | Woodard et al. |
| 2002/0152279 A1 | 10/2002 | Sollenberger |
| 2003/0015885 A1 | 1/2003 | Landwehr |
| 2003/0083938 A1 | 5/2003 | Smith et al. |
| 2003/0158855 A1 | 8/2003 | Farnham et al. |
| 2003/0167324 A1 | 9/2003 | Farnham et al. |
| 2004/0044907 A1* | 3/2004 | Sun .................. 713/201 |
| 2005/0159970 A1 | 7/2005 | Buyukkokten et al. |
| 2005/0160065 A1 | 7/2005 | Seeman |
| 2005/0203929 A1* | 9/2005 | Hazarika et al. ............ 707/100 |
| 2005/0256844 A1 | 11/2005 | Cristol |
| 2006/0031114 A1 | 2/2006 | Zommers |
| 2006/0085415 A1 | 4/2006 | Jian |
| 2006/0156242 A1 | 7/2006 | Bedingfield |
| 2006/0161534 A1 | 7/2006 | Carson et al. |
| 2006/0212377 A1 | 9/2006 | Smith et al. |
| 2006/0240395 A1 | 10/2006 | Faist et al. |
| 2007/0005654 A1 | 1/2007 | Schachar et al. |
| 2007/0067210 A1 | 3/2007 | Rishell et al. |
| 2007/0067305 A1 | 3/2007 | Ives |
| 2007/0106780 A1* | 5/2007 | Farnham et al. ............ 709/223 |
| 2007/0124285 A1 | 5/2007 | Wright et al. |
| 2007/0156856 A1 | 7/2007 | Shafron |
| 2007/0179945 A1 | 8/2007 | Marston et al. |
| 2007/0239680 A1 | 10/2007 | Oztekin et al. |
| 2007/0250405 A1 | 10/2007 | Ronen et al. |
| 2008/0005249 A1 | 1/2008 | Hart |
| 2008/0034058 A1 | 2/2008 | Korman et al. |
| 2008/0052203 A1 | 2/2008 | Beyer et al. |
| 2008/0091511 A1 | 4/2008 | Monin et al. |
| 2008/0091774 A1 | 4/2008 | Taylor et al. |
| 2008/0091777 A1 | 4/2008 | Carlos |
| 2008/0097663 A1 | 4/2008 | Morimoto |
| 2008/0126115 A1 | 5/2008 | Bennett et al. |
| 2008/0147578 A1 | 6/2008 | Leffingwell et al. |
| 2008/0147805 A1 | 6/2008 | Abecassis et al. |
| 2008/0172370 A1 | 7/2008 | Farouki |
| 2009/0042549 A1 | 2/2009 | Lee |
| 2009/0089286 A1 | 4/2009 | Kumar et al. |
| 2009/0094223 A1 | 4/2009 | Berk et al. |
| 2009/0106676 A1 | 4/2009 | Brezina et al. |
| 2009/0171904 A1 | 7/2009 | O'Sullivan et al. |
| 2009/0176509 A1 | 7/2009 | Davis et al. |
| 2009/0177754 A1 | 7/2009 | Brezina et al. |
| 2009/0228555 A1 | 9/2009 | Joviak et al. |
| 2009/0234874 A1* | 9/2009 | Sylvain .................. 707/102 |
| 2009/0319466 A1 | 12/2009 | Liu et al. |
| 2010/0042570 A1 | 2/2010 | Mayers et al. |
| 2010/0169265 A1* | 7/2010 | Ristock et al. .................. 706/52 |
| 2010/0175000 A1 | 7/2010 | Gupta et al. |
| 2010/0228560 A1 | 9/2010 | Balasaygun et al. |
| 2010/0306185 A1* | 12/2010 | Smith et al. .................. 707/709 |
| 2011/0047511 A1 | 2/2011 | Essl et al. |
| 2011/0099211 A1 | 4/2011 | Hyatt et al. |
| 2012/0254312 A1* | 10/2012 | Patel .............................. 709/204 |
| 2013/0046582 A1 | 2/2013 | Ramer et al. |

OTHER PUBLICATIONS

Cloud-Based Social Address Book: IQzone dynamically augments subscriber data from any device, on any platform, anywhere, anytime. http://www.iqzone.com/address.aspx. Copyright 2007.

Fidg't: Your Social Networking Address Book. Powerful web tools let you unify your buddy lists. http://www.fidgt.com/features. 2009 protohaus.

SocialPhone 2.0 is the ultimate address book for the Iphone/Ipad touch. Social Phone is the ultimate address book combining all your contacts and social networks in one simple application. http://www.phoapps.com/socialphone.html. Copyright 2010.

PA-F-Siteseer, James Rucker : Personalized Navigation for the web. Mar. 1997/vol. 40, No. 3.

U.S. Appl. No. 61/018,883, (018883, Specification, whole document.pdf), Brezina et al., Jan. 3, 2008.

Office Action mailed Jan. 18, 2013, in corresponding U.S. Appl. No. 13/405,135.

Non-Final Office Action mailed Mar. 14, 2013, in corresponding U.S. Appl. No. 13/405,105.

Final Office Action mailed Jan. 31, 2011, in corresponding U.S. Appl. No. 12/070,348.

English abstract for KR20020067102; published on Aug. 22, 2002.

* cited by examiner

SYSTEMS AND METHODS OF ADJUSTING CONTACT IMPORTANCE FOR A COMPUTING DEVICE

FIELD OF TECHNOLOGY

The present disclosure relates generally to computing devices. More specifically, the present disclosure relates to systems and methods of evaluating and ranking the importance of contacts.

BACKGROUND

With the advent of more robust computing systems, computing devices, including electronic communications devices, are becoming more prevalent. Furthermore, the amount of information which can be accessed and stored by computing devices has continues to grow. Information that can be accessed and stored can include contact information pertaining to computing devices such as telephone numbers and email addresses. For example, contact information can be accessed by one or more devices via networks and via the internet.

BRIEF DESCRIPTION OF THE DRAWINGS

Embodiments of the present application will now be described, by way of example only, with reference to the attached Figures, wherein.

DETAILED DESCRIPTION

Figure 1:
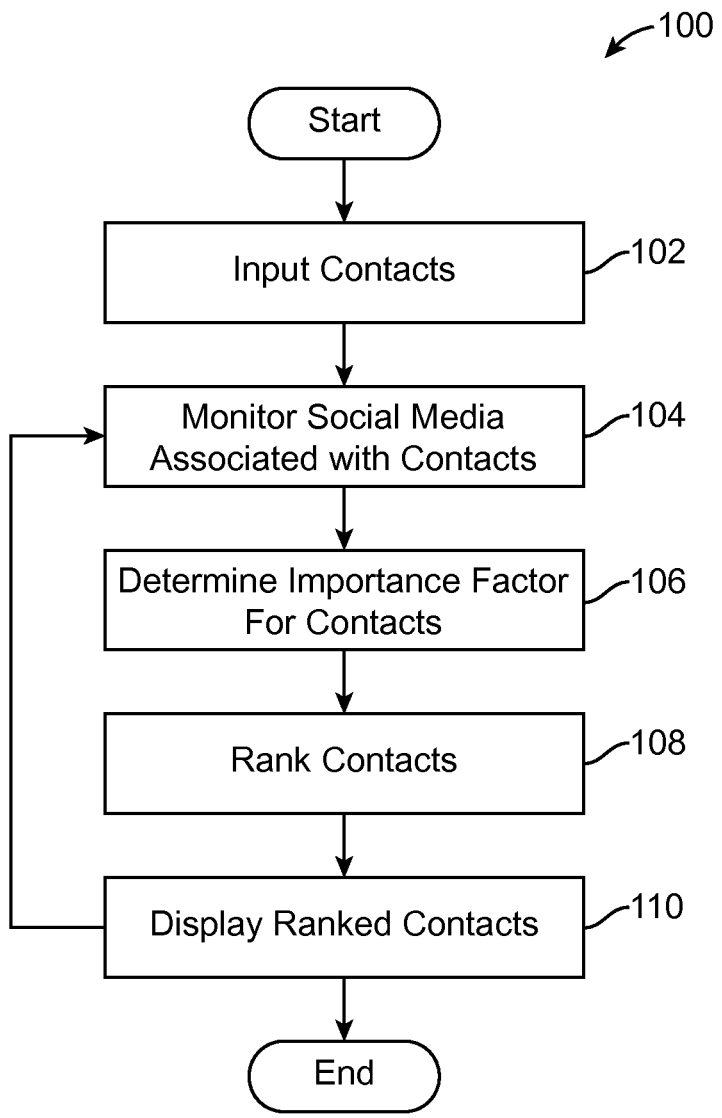
FIG. 1 is a flow chart of a method for adjusting the importance of a contact in a contact application in accordance with an example embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the example embodiments described herein. However, it will be understood by those of ordinary skill in the art that the example embodiments described herein can be practiced without these specific details. In other instances, methods, procedures and components have not been described in detail so as not to obscure the related relevant feature being described. Also, the description is not to be considered as limiting the scope of the example embodiments described herein.

Several definitions that apply throughout this document will now be presented.

The phrase "communicatively coupled" is defined as connected, whether directly or indirectly through intervening components and is not necessarily limited to physical connections.

The term "computing device", "electronic device" or "device" is defined as any computing device that is capable of processing data or executing commands or processing data and executing commands. For example, electronic devices can include and are not limited to mobile communication devices, mobile computers, smartphones, electronic pads, electronic tablets, desktop computers, laptop computers, netbooks, devices with web browsing capability, or other electronic devices capable of processing data or executing commands or processing data and executing commands.

The term "database" is defined as one or more collections of data or information stored in electronic form. For example, databases can include data stored in memory by computing devices or electronic devices, such as servers, server computers, mobile computers, smartphones, electronic pads, electronic tablets, desktop computers, laptop computers, netbooks, or other electronic devices. Databases can contain one or more contact repositories. A database accessible, or useful to, or communicatively coupled to, a computing device may be stored locally on that computing device or may be stored externally on one or more other computing devices, such as a server.

The term "address book" can be defined as at least one database configured for storing entries called contacts. An address book may be stored locally to a computing device or externally on one or more other devices, such as, for example, one or more remote servers or via cloud computing.

The term "contact" or "contact data" can be defined as a collection or grouping of one or more fields of information pertaining to a person, an organization, or a website, such as, for example, first name, last name, company name, address, telephone number, e-mail address, fax number, mobile phone number.

The term "address book application" is defined as software or firmware or both, configured to receive, store or manage contact data in one or more computing devices. An address book application can be executable by one or more computing devices.

The term "importance" is defined as the relevance of a contact.

The term "importance value" is defined as a value corresponding to, or in indicative of, the importance of a contact. An importance value can correspond to a numerical value or can be assigned a numerical value. As will be discussed in further detail below, importance can be adjusted or adjustable according to a number of criteria on an iterative basis.

The term "iteration" means the act of repeating a process and the term "iterative" means repetitious or frequent.

The term "social media" is defined as electronic communications between two or more electronic devices and software, hardware, networks and services configured to manage such communications. Social media includes, but is not limited to, email communications, web-based communications, telephonic communications and software application-supported communications and services, such as Twitter™, Facebook™, Linkedin™, Gist™ and the like. The term "note" is defined as text information.

The present disclosure relates to systems and methods of managing and displaying contact data. For example, systems and methods of managing data can include determining and updating contacts based upon the importance of a contact. The methods can include managing contacts by determining and ranking importance values for contacts. The methods can also include displaying contacts based on a ranking of the importance of one or more contacts. The methods can further include displaying contacts ranked according to their relative importance. The embodiments set forth in this disclosure will be understood to constitute non-limiting examples, and those of ordinary skill in the art will appreciate that the present disclosure is not limited to address book implementations. In other example embodiments, the systems and methods disclosed herein can be implemented in online shopping systems, mapping systems, media subscription systems, social media systems, blogging systems, or other systems in which the management of contacts based on their importance can be utilized or implemented.

In at least one example embodiment, contact importance can be managed and determined based on multiple criteria, on an ongoing basis, or on an iterative basis, or both. Contacts can be ranked or listed, based, at least in part, on their importance. Furthermore contacts can be displayed on the display of an electronic device in one or more listed ranked in relation to their importance. In at least one example embodiment, importance values are used in determining how contact data or contact information is displayed by an electronic device. For example, information relating to a contact with a contact value above a certain threshold can be provided in a font, size or color which is different from the font, size or color of displayed information relating to a contact which has an importance value which is below a certain threshold.

The methods and systems described herein enable the importance of contacts within one or more computing devices to be frequently evaluated and reevaluated. The methods and systems described further enable contacts to be ranked according to their relative importance with respect to other contacts. Thus, in at least one example embodiment, contacts are ranked according to their importance, with more important contacts being ranked higher than contacts of lower or less importance. In at least one example embodiment, importance corresponds to an importance value which may be a numerical value which is determined based on a multitude of factors on an ongoing basis. In at least one example embodiment, a list of contacts can be displayed on a display of an electronic device wherein the contacts are listed according to their rank.

Not all contacts may necessarily of equal importance at a given time. The methods and systems described in this disclosure are useful because they can minimize the need for searching through an alphabetical list of contacts to find a particular contact. For example, if there are a large number of contacts stored on an electronic device or otherwise associated with an electronic device, finding an individual contact based on the name associated with that contact can be difficult and time consuming. This problem can be solved by this disclosure by enabling a list of contacts to be displayed according to their importance. Listing contacts which are more important towards the top of a list of contacts displayed on an electronic device can typically reduce the search time because the user does not need to go through a list of less important contacts.

The methods and systems described herein are useful because they can reduce the need for accurately remembering the name of a desired contact. For example, if a contact has not communicated with an electronic device for an extended period of time, it may be difficult to remember the name associated with that contact. If, however, the contact becomes more important, and as a result it becomes more likely that communications with that contact will be desirable, then placement of that contact higher in a list of contacts can decrease the amount of searching or scrolling that would be required to find that contact and it can thereby become less necessary to remember the name of the contact There are number of factors that can go into determining the importance value for a contact. For example, a contact with which an electronic device has not corresponded within a certain period could have its importance value lowered. Likewise, if an electronic device has subscribed to an information service, such as a feed (for example, an RSS™ feed) posted by a contact, that fact can mean that the importance value for that contact is raised. Similarly, if an electronic device receives a news notification (such as via push technology) stemming from, or in relation to, a contact, the importance value for the contact can be revised upwardly.

While the quantity and timing of email communications with a contact can be a factor in used in determining the importance value for a contact, other criteria can also be factors. Other factors can include, for example, the identity of the contact, the relationship of the contact to the user of a device, the number of networks shared by the contact with the device, the identity of a network shared by the contact and user of the device, whether the contact pertains to a person or an organization, the frequency with which an electronic device visits or communicates with a website pertaining to a contact, how recently an electronic device has visited or communicated, the quantity and timing of instant messages received from or sent to a contact, the quantity and timing of telephonic communications with a contact, the number of meetings calendared to be held with a contact, and the quantity and timing of news feed communications received from, or communicated to, a contact. Other factors can include the quantity and timing of social media communications which have a contact as a subject, the quantity and timing of social media invitations received from, or transmitted to, a contact, as for example, when a contact requests invites an electronic device to register as a friend on Facebook™ or Gist™. Other factors that can affect the importance value for a contact can include the number of web based searches by or about a contact performed by an electronic device and the number of profile requests by or about a contact.

By frequently reevaluating and adjusting and assigning importance values to contacts based on news received by, or pertaining to a contact, or actions taken by an electronic device with regard to a contact, the systems and methods of this disclosure enable an electronic device to receive and display a more relevant listing of contacts than if contact importance were based only on the number and recentness of emails sent to a contact or received from a contact.

In at least one example embodiment, an electronic device can be communicatively coupled to a contact repository, such as an address book, or a list of contacts or both, that can be stored locally on the computing device, on a server, or a combination thereof. At least one or more social media can be monitored for communications which are associated with each contact. The nature, type, timing and quantity of communications monitored can be used to determine the importance value of a contact. As will be explained in greater detail, an importance value can be determined for a contact based on many criteria, relating to, by way of example only, the recentness that a contact's information was updated or revised as described above, how recently the contact was added to an electronic device's address book, (or another electronic device's address book), whether a contact's website was recently accessed by an electronic device, the identity of the contact and the nature of the relationship between a contact and an electronic device.

While automatically adjusting contact importance values according to various criteria as set forth above, in at least one example embodiment, importance values can also be set in response data inputs such as keystrokes on a keyboard, the manipulation of a slider on a display, a touch contact on a touch sensitive device, and the like.

As will be explained in greater detail below, at least one example embodiment is a computer-implemented method for adjusting the importance of a contact in a contact application. The technology can import contacts from social media and can receive contacts and contact information directly via inputs received via one or more input devices. The technology can be configured for monitoring social media for one or more communications associated with each contact. The technology can determine an importance value for each contact based on a number of predetermined criteria including the amount of communications associated with each contact. The technology can rank the contacts in accordance with an importance value associated with each contact; and display the contacts according to the ranking of the contacts.

In at least one example embodiment, social media can be monitored for communications by an electronic device. Monitored social media can include social networks comprising email accounts, LinkedIn®, Facebook®, Twitter®, and Chatter®, or others.

In at least one example embodiment, the numerical value or weight associated with email exchanges with a contact can be lowered over time, as for example, when an electronic device has not sent the contact an email to a contact for a prescribed period.

In at least one example embodiment, an electronic device can be configured to display contacts in accordance to the ranking of the contact can include displaying a name for a contact and its associated importance value. The displayed importance value can include a numerical value and a sliding scale. A sliding scale can enable an electronic device to receive an input to visually adjust an importance value.

In at least one example embodiment, the numerical value or weight associated with email exchanges with a contact can be lowered over time, as for example, when an electronic device has not sent the contact an email to a contact for a prescribed period.

In at least one example embodiment, the numerical value can be based in part on a fixed value based on the social media from which the contact was obtained. In at least one example embodiment, the numerical value is periodically reassessed based on each email exchanges with the contact. The numerical value can be reassessed according to other predefined criteria, as set forth above.

In at least one example embodiment, an electronic device can be configured to display contacts in accordance to the ranking of the contact can include displaying a name for a contact and its associated importance value. The displayed importance value can include a numerical value and a sliding scale. A sliding scale can enable an electronic device to receive an input to visually adjust an importance value.

In at least one example embodiment, displaying the contacts in according to rank can include displaying a name of a company associated with each contact in the event a company is associated with the contact 304, a number of social media sources, a number of emails sent to the contact for a given period, a number of emails received from the contact for the given period, a date of the last email sent or received. In at least one embodiment, an electronic device can be configured to revise importance value for a given contact in response to receiving input via one or more input devices, such as keystrokes on keypad or a touch contact on a touch screen of an electronic device.

In at least one example embodiment, displaying the contacts according to rank can include displaying a name of a company associated with each contact in the event a company is associated with the contact, a number of social media sources, a number of emails sent to the contact for a given period, a number of emails received from the contact within a given period, and a date of the last email sent to a contact or received from a contact. In at least one example embodiment, an electronic device can be configured to revise an importance value for a given contact in response to receiving manual input via one or more input devices, such as keystrokes on keypad or a touch contact on a touch screen of an electronic device.

In at least one example embodiment, the importance value for a contact can be affected by whether a contact in the device's contact list or address list has recently posted a communication on a feed to which the device has subscribed or to a website which the device has accessed within a predetermined amount of time. In at least one example embodiment, the importance value for a contact can be affected by whether a contact has recently posted a communication on a feed. Thus, as will be explained in greater detail below, the importance value for a contact can be affected by evaluation of multiple criteria, of which posting a communication by a contact is just one example.

FIG. 1 illustrates a flow chart of an example embodiment of a method 100 for adjusting the importance of a contact in a contact application. In FIG. 1, beginning at step 102 contacts are input into a database. Inputting can be done manually, by linking a device to one or more other devices or networks, and/or by importing from other sources, or any combination thereof. For example, contacts can be imported from at least one social media, for example, Twitter™, Outlook™, Linkedin™, email accounts, Skype™, and the like. Contacts can be input manually into an electronic device such as by activating keys on a keyboard or keypad within an electronic device or communicatively coupled to an electronic device, a touch contact on a touch screen within an electronic device or communicatively coupled to an electronic device, or activation of a navigation tool, such as an optical navigation tool, mouse, track-pad, or the like. For example, contact data can be manually typed into one or more fields. A electronic device can be configured to present suggested contact information which can be confirmed or changed by one or more manual inputs as described above. Other means of inputting contacts are possible, including but not limited to, requesting contact data from other devices, downloading contact data from other devices, importing contact data from other applications present on an electronic device, importing contact data from applications present on a server, receiving contact data from one or more electronic subscription services or information feeds.

The following equation is an example of a function an importance value:

$$I_C = ((5*\text{importance\_calcscsv\_accounts}) + $$
$$(1*(\text{importance\_eventsmessages\_from\_user} +$$

-continued $$\begin{aligned}
&importance\_events.recent\_messages\_from\_user)) + \\
&(4 * (importance\_events.events\_with\_user + \\
&\quad importance\_events.recent\_events\_with\_user)) + \\
&(1 * (importance\_events.recent\_entity\_page\_views + \\
&\quad importance\_events.entity\_page\_views)) + \\
&(0.25 * (importance\_events.client\_news\_views + \\
&\quad importance\_events.recent\_client\_news\_views)) + \\
&(0.25 * (importance\_events.client\_notes\_views + \\
&\quad importance\_events.recent\_client\_notes\_views)))
\end{aligned}$$

In the above example equation, an importance value for a contact ("C") is the sum of various factors. Factors can include the number of social media shared between an electronic device and a contact, ("importance_calcs.csv_accounts"), the total number of communications received from a contact and send to a contact, ("importance_events.messages_from_user"), and the number of communications send to a contact or received from a contact within a specified period, ("importance_events.recent_messages_from_user). Factors can also include the number of predetermined types of events that have occurred with regard to a contact, ("importance_events.events_with_user"), the number of predetermined types of events that have occurred with regard to a contact, ("importance_events.recent_events_with_user"), and whether an electronic device has viewed a web site pertaining to a contact within a specified period, ("importance_events.recent_entity_page_views"). Factors can also include the total number of times an electronic device has viewed a web site pertaining to a contact, ("importance_events.entity_page_views"), the number of news communications received by an electronic device pertaining to a contact, ("importance_events.client_news_views"), and the number of news communications received by an electronic device pertaining to a contact within a specified period, ("importance_events.recent_client_news_views"). Other possible factors are whether an electronic device has received a text message pertaining to a contact, ("importance_events.client_notes_views"), and the number of text messages received by a contact within a specified period of time, ("importance_events.recent_client_notes_views"). It will be understood that the above equation is but one example for determining an importance value for a contact, and other factors and weights are possible within this disclosure.

Table 1, shown below, illustrates a table of values associated with a contact, some of which can be utilized in calculating the importance value for a contact. For example, Table 1 shows the type of a contact, ("person") and the importance value for the contact ("71"). Table 1 also shows example criteria or factors that can be used in determining an importance value for a contact. For example, criteria can include the number of social media accounts shared between an electronic device and a contact ("accounts"), and the number of messages sent by an electronic device to a contact or received by an electronic device contact, or both, ("messages_from_user"). Criteria can also include the number of invitations received by a device from a contact ("invites") and the number of news items received about the contact ("client_news_news") and the number of notes viewed by a contact, ("client_notes_views").

TABLE 1

| | |
|---|---|
| user_id | 209086 |
| entity_id | 26727738 |
| entity_type | Person (1) |
| importance | 71 (db: 30) |
| accounts | 7 |
| email_accounts | 1 |
| csv_accounts | 0 |
| messages_from_user | 4 |
| events_with_user | 6 |
| recent_messages_from_user | 0 |
| recent_events_with_user | 2 |
| slider_importance | NULL |
| total_importance | 71 (db: 30) |
| calendar_accounts | 1 |
| beta_importance | 70 (db: 31) |
| beta_total_importance | 70 (db: 31) |
| entity_page_views | 0 |
| recent_entity_page_views | 0 |
| beta_score | 32 |
| score | 32 |
| share_news_tos | 0 |
| recent_share_news_tos | 0 |
| share_news_abouts | 0 |
| recent_share_news_abouts | 0 |
| share_contacts_tos | 0 |
| recent_share_contacts_tos | 0 |
| share_contact_abouts | 0 |
| recent_share_contact_abouts | 0 |
| invites | 0 |
| recent_invites | 0 |
| request_profiles | 0 |
| recent_request_profiles | 0 |
| updated_notes | 0 |
| recent_updated_notes | 0 |
| client_news_views | 0 |
| recent_client_news_views | 0 |
| client_notes_views | 0 |
| recent_client_notes_views | 0 |

With further reference to FIG. 1, at step 104 at least one social media is monitored for one or more communications with one or more contacts. Monitored communications can include email communications, Twitter™ communication, Outlook™ communications, Linkedin™ communications, Skype™ communications, and Facebook™, RSS™ feed communications, and the like. Social media can be monitored with regard to the quantity of communications communicated via a social media and with regard to the timing of the communications via a social media. Additionally, social media can be monitored with regard to the subject matter of their communications, or with regard to the source of a communication or with regard to the recipient of a communication, or any combination thereof. For example, the method 100 can monitor whether a contact is the subject of a communication, whether a contact is a source of a communication, whether a contact is a recipient of a communication, or any combination thereof.

At step 106, an importance value for each contact based on various criteria as described herein, including but not limited to, the number or quantity of communications associated with each contact, as described below, is then determined. An importance value for a contact can be the sum of multiple weighted factors. An importance value can be updated each time a communications event pertaining to a contact occurs.

Figure 5:
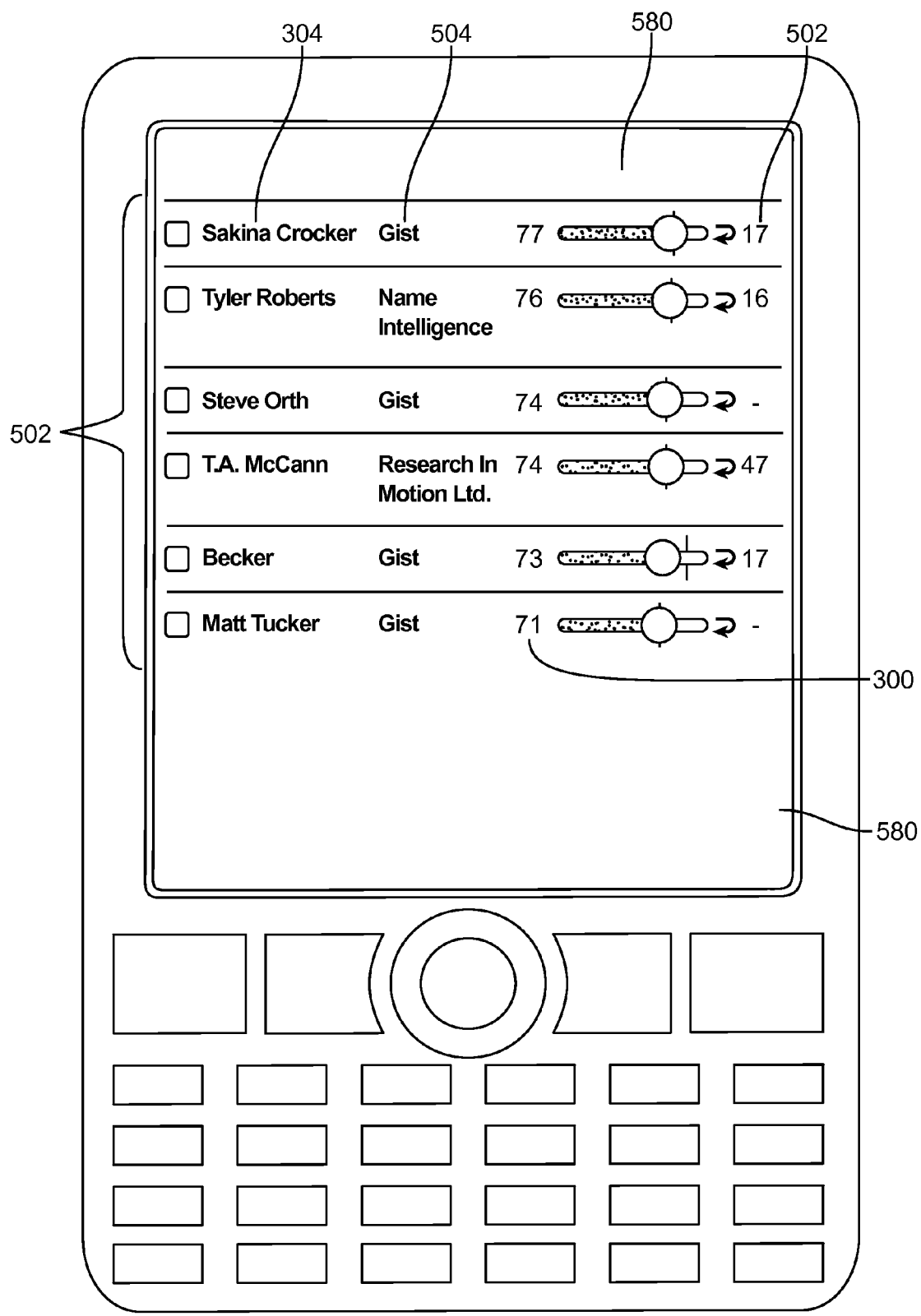
FIG. 5 is an elevational view of a device displaying a graphical user interface listing contacts ranked by importance in accordance with an example embodiment.
Figure 6:
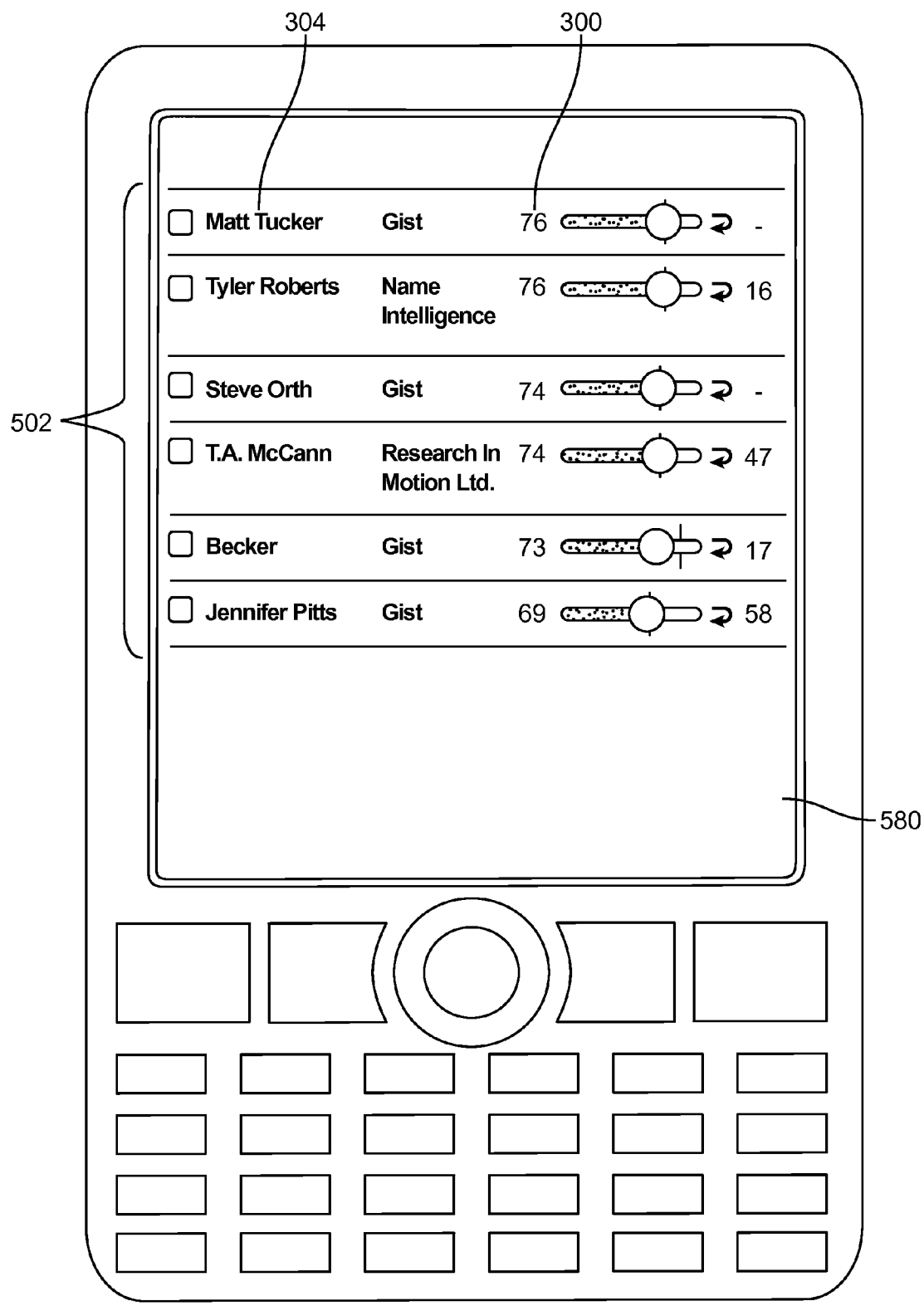
FIG. 6 is another elevational view of a device displaying a graphical user interface listing contacts ranked by importance on a display of an electronic in accordance with an example embodiment.

With further reference to FIG. 1, at step 108, contacts are ranked in accordance with their relative importance, with contacts having a higher importance value being ranked higher than contacts having a lower importance value. At step 110, a list of contacts can be ranked according to their importance can be displayed on the display of an electronic device, (e.g. FIG. 5 and FIG. 6 show a list of contacts ranked according to their importance). It will be understood that the process of monitoring contact information and updating importance values can be done on an iterative or substantially continuous basis. The example method 100 illustrated in FIG. 1 is provided by way of example, as there are a variety of ways to carry out the method. Additionally, while the example method 100 is illustrated with a particular order of steps, those of ordinary skill in the art will appreciate that FIG. 1 is by way of example, and the steps illustrated therein can be executed in any order that accomplishes the example methods of the present disclosure described herein and can include fewer or more steps than as illustrated. The method 100 described can be carried out by an electronic device communicatively coupled to at least one remote electronic device. Each step shown in FIG. 1 represents one or more processes, methods or subroutines, carried out in example method 100. For example, each block shown in FIG. 1 can be carried out by a processor of an electronic device.

Figure 2:
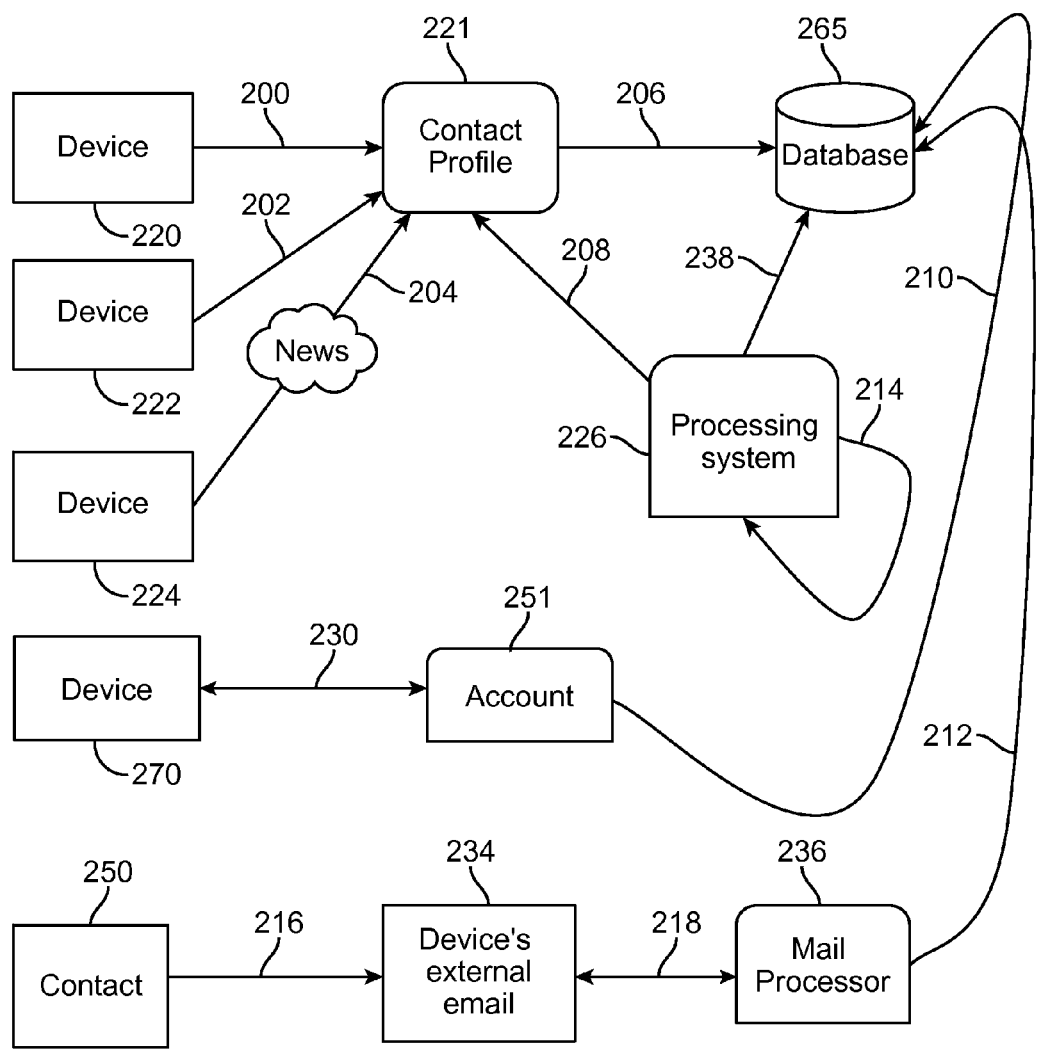
FIG. 2 is a block diagram illustrating the communication between a processing system and one or more electronic devices in accordance with an example embodiment.

FIG. 2 is a block diagram illustrating the communication between a processing system and more than one electronic device in accordance with an example embodiment. A first electronic device 220 can view 200 a contact profile 221 stored either remotely or locally. A second electronic device (e.g., 222), can edit 202 notes or other information in the contact profile 221 stored in one a database 265. It will be understood that the contact profile can be retrieved from and stored in one or more databases 265. With further reference to FIG. 2, a third electronic device 224 is shown viewing 204 news pertaining to a contact, (for example, viewing an update from a Twitter™ feed or RSS™ feed or the like). Each of these events, 200, 202, 204 are recorded 206 and stored in a database 265 via a contact profile 221. It will be appreciated that the device interacting at 200, 202, and 204 with contact profile 221, can be the same device, though this does not necessarily have to be the case. A fourth electronic device 270 is shown importing 230 information from one or more accounts 251 and this event and corresponding contact data is imported and stored 210 in the database 265 via the account. Again, each device 220, 222, 224, 270 can be the same device, though this does not have to be the case. With further reference to FIG. 2, a contact 250 (e.g. 304 of FIGS. 3-6) sends 216 an email through an electronic device's external email service 234. The device then receives a new email 218 and the email is processed by the device's email processor 236. This email event is then recorded in the database 212. The processing system 226 retrieves 238 the recorded data from database 265, processes it using an importance algorithm, updates the contact's importance information in the contact profile 221 and stores the revised contact importance value in the database 265.

In at least one example embodiment, the database 265 is remotely stored on a storage medium directly accessible by an electronic device (e.g. 220) or indirectly accessible, or both. A computing device or electronic device 220 can be enabled to search, retrieve, delete, supplement, and update contact entries, including contact data, stored on the database 265. A contact entry can include a profile including contact information associated with the contact. For example, the contact information can include, but is not limited to, a name of a contact, a home phone number, a mobile phone number, a work phone number, a home address, a name of an employer, a work address, an email address, a website, or other contact data can be stored. Contact data, including importance values associated with one or more contacts, as discussed above, can be updated on an ongoing, dynamic basis. The updating can occur on a real-time basis, near real-time basis and an iterative basis.

In at least one example embodiment, a database 265 can be stored on a computer storage medium directly coupled to the electronic device, such as an secure digital (SD) card, a non-transitory memory coupled to an electronic device, a memory card, or other storage medium which can be directly coupled to an electronic device (e.g., 220) and which can store information accessible by an electronic device (e.g., 220) thereon. Importance values can be stored in the database 265.

Figure 3:
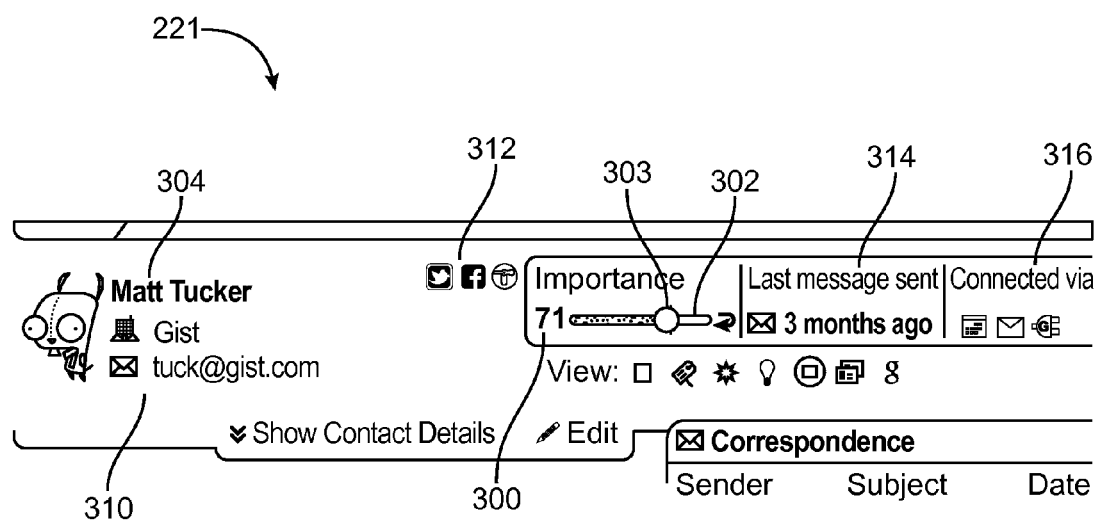
FIG. 3 is a graphical user interface displaying a contact importance value in accordance with an example embodiment.

FIG. 3 illustrates a graphical user interface on a display of an electronic device in accordance with an example embodiment. The graphical user interface of FIG. 3 shows a possible view of a contact profile 221 for a contact 304 (e.g. Matt Tucker). In the example embodiment shown, the contact profile 221 includes an email address 310 of a contact 304. The contact profile 221 also includes information or news services or communications systems 312 which are shared with a contact 304. The contact profile 221 shows the timing of the most recent email correspondence with the contact 314 and available networks 316 through which the contact 304 may be accessed by an electronic device. The contact profile 221 shows the current importance value 300 of the contact. The viewing of the contact profile 221 is an example of monitoring one or more social media as described with reference to step 108 of FIG. 1.

When an electronic device views a contact profile 221, such as the one shown in FIG. 3, a view event (which is an example of a monitored communication) is recorded, and this can cause the importance value for the contact 304 to be adjusted. Another event which may cause the importance value 300 to be adjusted is the receipt of a news item from a contact 304. Another even which may cause an importance value to be adjusted is the receipt of a news item about the contact. Furthermore, the importance value 300 may be adjusted based on the quantity or timing of emails to or from a contact 304. Furthermore, importance values 300 may be adjusted based on information contained within an email, such as for example when the email contains information about a certain topic. FIG. 3 also illustrates a possible means by which an importance value 300 ("71") can be manually adjusted. The importance value 300 can be adjusted by moving a button 303 along the slider bar 302. Other means by which importance can be manually adjusted are possible, such as, for example a dial or knob.

Figure 4:
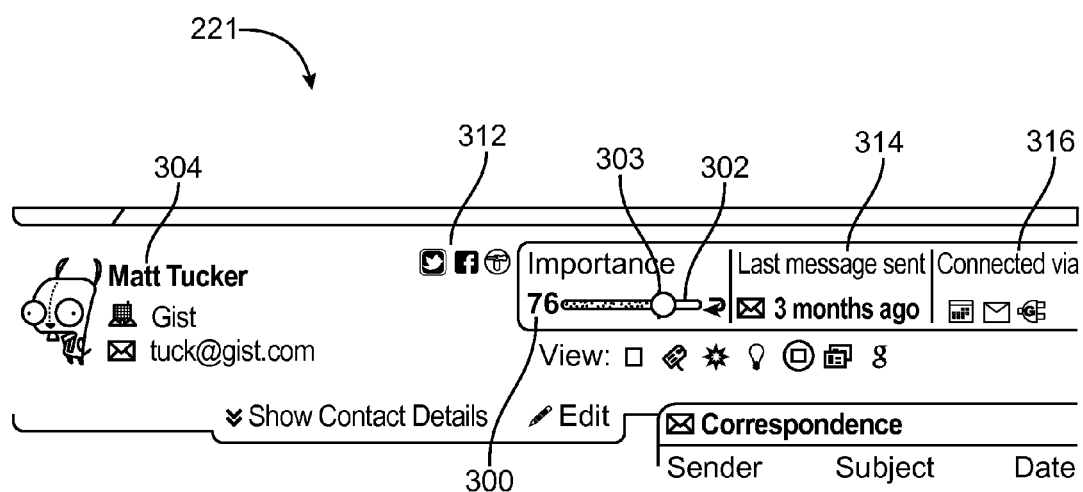
FIG. 4 is a graphical user interface displaying a different contact importance value in accordance with an example embodiment.

As explained above, the viewing of a contact profile 221 can affect the importance value 300 for a contact 304. FIG. 4 shows a graphical user interface containing the contact profile 221 for the contact 304 from FIG. 3. After the view event shown in FIG. 3 takes place, and as a consequence thereof, the importance value 300 for the contact is adjusted from "71" to "76."

FIG. 5 illustrates a graphical user interface on a display 580 of an electronic device (e.g. device 220, 222, 224 or 270 of FIG. 2) in accordance with an example embodiment. FIG. 5 shows a list of contacts 502 ranked according to their importance (in other words, their importance values). The list 502 shows the values associated with contacts at a time just before the view event of FIG. 3. FIG. 5 lists five contacts 502 with contact 304 Sakina Tocker with the highest importance value 300, "77" at the top of the list and contact 304 Matt Tucker with the lowest importance value 300 at the bottom of the list. Also in FIG. 5, the most recent 502 importance value 300 for each contact 304 is displayed. Also in the example embodiment shown in FIG. 5, employer information 504 is shown for each contact 304.

FIG. 6 illustrates another graphical user interface on a display 580 of an electronic device (e.g. device 220, 222, 224 or 270 of FIG. 2) in accordance with an example embodiment.

FIG. 6 shows a list of contacts 502 ranked according to importance as in FIG. 5, but the importance value for contact Matt Tucker has been adjusted by the view event of FIG. 3. Contact Matt Tucker's importance value has been adjusted from "71" (see FIG. 3 and FIG. 5) to "76" (see FIG. 4). In the examples of FIG. 4 and FIG. 6, the importance value 300 of a contact was adjusted by a view event like the one shown in FIG. 3. However, it will be appreciated that other events, such as for example, receipt of an email from a contact, can be used to adjust contact importance 300. Other events can include, but are not limited to the receipt of news data from a contact, the sending of news data to a contact, the receipt of news data and the sending of news data pertaining to a particular contact. Other events can include the posting of a note to a contact or the viewing of a note by a contact, or both. Other events can include the creation of a social media account by a contact which is shared by an electronic device and the posting of a calendar event to an electronic device by a contact, such as for example scheduling of a meeting with a contact via Outlook™.

FIG. 5 and FIG. 6 show a front view of an electronic device configured to receive and display suggested contact data in accordance with an example embodiment. In FIG. 5 and FIG. 6, the remote electronic device 220 is a smartphone. As illustrated in FIG. 5 and FIG. 6, the remote electronic device 220 includes a display 580. The display 580 can be, for example, a liquid crystal display (LCD), a light emitting diode (LED) display, an active matrix organic light emitting diode (AMOLED) display, a cathode ray tube display, or any other display which can be configured to display graphical and textual information.

As shown in FIG. 5 and FIG. 6, a graphical user interface can display a list of a plurality of contacts 502. The contacts are listed 502 according to their importance, with contacts having a higher importance 300 at or toward the top of the list 502 and those with a lower value at or toward the bottom of the list 502. In at least one example embodiment, when the address book application is launched, a prompt can be displayed on the display of the remote electronic device (not shown). The application can be an address book application such as a converged address book application which is configured to compile contact data from a plurality of address books (for example, an electronic device's address book, cell phone address book, work address book, or other address book), an address book monitoring application which can be configured to monitor and compile contact data from a plurality of various sources.

Figure 7:
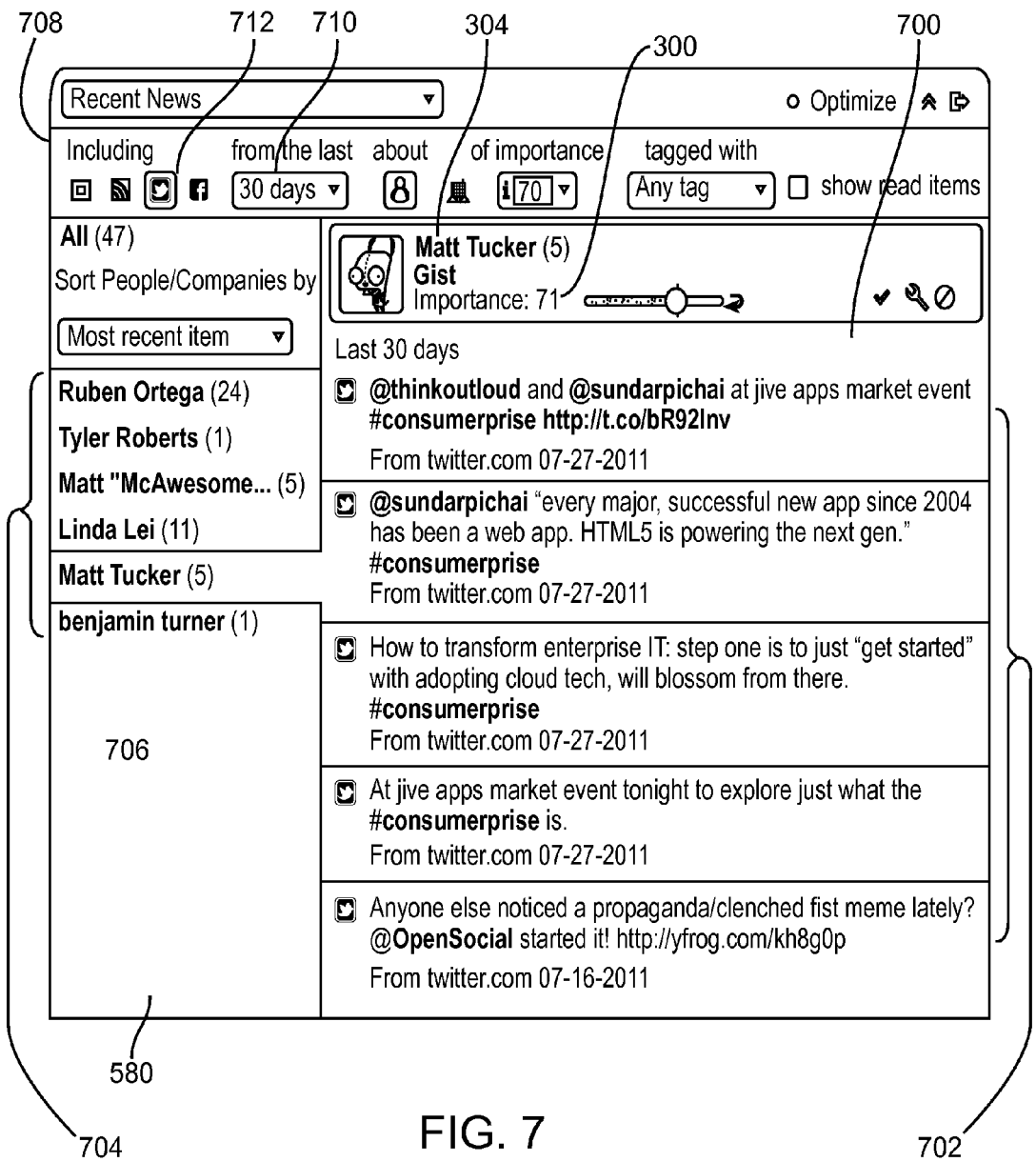
FIG. 7 is a graphical user interface displaying a contact importance value and displaying communications information pertaining to the contact in accordance with an example embodiment.

In the example graphical user interface (of a device e.g. device 220, 222, 224 or 270 of FIG. 2) illustrated in FIG. 7, contact 304 information or data (in this example a contact name, "Matt Tucker") including an importance value 300 is depicted alongside social media news information 700 relating to the contact 304. The last five communications 702 and/or news events 702 which pertain to the contact 304 or which were sent to a contact 304, or both, are shown. Also shown are six selectable contacts 704, which includes the contact 304 for which an importance value 300 is displayed. Also shown are the number or quantity of recent communications or recent events 706 which are available for viewing upon selection of one of the selectable contacts 704. Also shown is the total number of contacts 708 which for which there have been communications events occurring within the last thirty days 710. Also shown are the selectable types of social media 712 for which there are viewable communications events 702.

Figure 8:
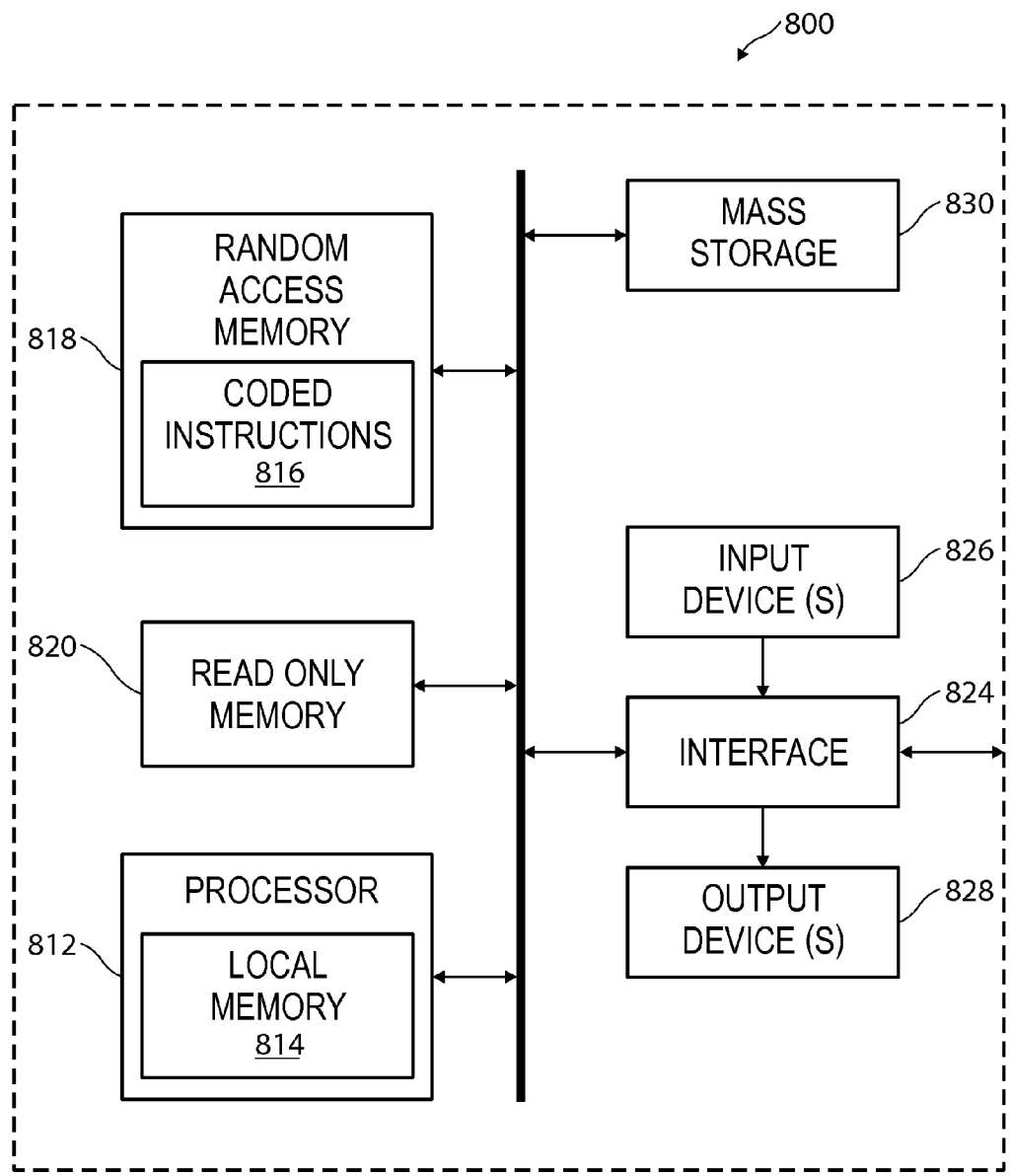
FIG. 8 is a block diagram of an example processing system capable of implementing the example apparatus and methods disclosed herein.

FIG. 8 is a block diagram of an example processing system or computing device 800 capable of implementing the apparatus and methods disclosed herein. The processing system 800 can correspond to, for example, electronic devices 220, 222, 224, 270, 250, a computing device storing and managing contact profile 221, a computing device storing and managing database 265, a computing device storing and managing one or more accounts 251, a computing device storing external emails and managing an external mail service 234, processing system 226, a server, a network computer, a personal computer, a personal digital assistant (PDA), an Internet appliance, a mobile phone, or any other type of computing device.

The system 800 of the instant example includes a processor 812 such as a general purpose programmable processor, an embedded processor, a microcontroller, etc. The processor 812 includes a local memory 814, and executes coded instructions 816 present in the local memory 814 and/or in another memory device. The processor 812 may execute, among other things, machine readable instructions to implement any, some or all of the methods represented in FIGS. 1 and 2 and disclosed herein. The processor 812 may be any type of processing unit, such as one or more microprocessors from the Intel® Centrino® family of microprocessors, the Intel® Pentium® family of microprocessors, the Intel® Itanium® family of microprocessors, and/or the Intel® XScale® family of processors, one or more microcontrollers from the ARM® family of microcontrollers, the PIC® family of microcontrollers, etc. Of course, other processors from other families are also appropriate.

The processor 812 is in communication with a main memory including a volatile memory 818 and a non-volatile memory 820 via a bus 822. The volatile memory 818 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 820 may be implemented by flash memory and/or any other desired type of memory device. Access to the main memory 818, 820 is typically controlled by a memory controller (not shown).

The system 800 also includes an interface circuit 824. The interface circuit 824 may be implemented by any type of interface standard, such as an Ethernet interface, a universal serial bus (USB), and/or a third generation input/output (3GIO) interface.

One or more input devices 826 are connected to the interface circuit 824. The input device(s) 826 permit a user to enter data and commands into the processor 812. The input device(s) can be implemented by, for example, a keyboard, a mouse, a touchscreen, a track-pad, a trackball, an isopoint and/or a voice recognition system.

One or more output devices 828 are also connected to the interface circuit 824. The output devices 828 can be implemented, for example, by display devices (e.g., a liquid crystal display, a cathode ray tube display (CRT)), by a printer and/or by speakers. The interface circuit 824, thus, typically includes a graphics driver card.

The interface circuit 824 also includes a communication interface such as a modem or network interface card to facilitate exchange of data with external computers via a network (e.g., an Ethernet connection, a digital subscriber line (DSL), a telephone line, coaxial cable, a cellular telephone system such as an EGPRS-compliant system, etc.).

The system 800 also includes one or more mass storage devices 830 for storing software and data. Examples of such mass storage devices 830 include floppy disk drives, hard drive disks, compact disk drives and digital versatile disk (DVD) drives.

The example embodiments of this disclosure can take the forms of hardware, or both hardware and software elements. In some example embodiments, the technology is implemented in software, which includes but is not limited to firmware, resident software, microcode, a Field Programmable Gate Array (FPGA) or Application-Specific Integrated Circuit (ASIC), etc. In particular, for real-time or near real-time use, an FPGA or ASIC example embodiment is beneficial.

Furthermore, the example embodiments can take the form of a computer program product comprising program modules accessible from computer-usable or computer-readable medium storing program code for use by or in connection with one or more computers, processors, or instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium (though propagation mediums in and of themselves as signal carriers are not included in the definition of physical computer-readable medium). Examples of a physical computer-readable medium include a semiconductor or solid state memory, removable memory connected via USB, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD, and Blu-Ray™. The medium will be understood to not comprise a signal. Both processors and program code for implementing each as aspect can be centralized or distributed within one or more networks.

An example processing system or computing device suitable for storing a computer program product of the present technology and for executing the program code of the computer program product will include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters can also be coupled to the system to enable the processing system to become coupled to other processing systems or remote printers or storage devices through intervening private or public networks. Modems, cable modem, WiFi™, and Ethernet cards are just a few of the currently available types of network adapters. Such systems can be centralized or distributed, e.g., in peer-to-peer and client/server configurations. In some example embodiments, the processing system is implemented using one or both of FPGAs and ASICs.

The foregoing examples and descriptions are merely examples and are not to be construed as limiting. The subject matter that is intended to be within the spirit of this disclosure is set forth in the following claims.

What is claimed is:

1. A computer-implemented method, comprising:
   importing contacts from at least one social media;
   monitoring the at least one social media for at least one communication associated with each contact;
   determining an importance value for each contact based at least in part on an amount of communications associated with each contact;
   ranking the contacts based at least in part on the importance value associated with each contact; and
   displaying the contacts based at least in part on the ranking of the contacts, wherein displaying the contacts comprises:
   displaying a name for each contact and the importance value determined for each contact, and
   displaying, a name of a company associated with each contact in the event a company is associated with each contact, a number of social media sources, a number of emails sent to each contact for a given period of time, a number of emails received from each contact for the given period of time, and a date of the last sent email or a date of the last received email.

2. The computer-implemented method of claim 1, further comprising adjusting the importance value for each contact based on a type of at least one monitored communication.

3. The computer-implemented method of claim 1, further comprising adjusting the importance value for each contact based on information contained within at least one monitored communication.

4. The computer-implemented method of claim 1, wherein the at least one social media includes social networks comprising email accounts, LinkedIn®, Facebook®, Twitter®, and Chatter®.

5. The computer-implemented method of claim 1, wherein determining the importance value comprises determining at least one numerical value.

6. The computer-implemented method of claim 5, wherein the importance value includes a fixed value based on the at least one social media being monitored for communications.

7. The computer-implemented method of claim 5, wherein the importance value of each contact is periodically adjusted based on each email exchange with each contact.

8. The computer-implemented method of claim 5, wherein the importance value is adjusted for email exchanges over time.

9. The computer-implemented method of claim 1, further comprising revising the importance value for a given contact in response to receiving input from an input device.

10. An electronic device, comprising:
    at least one processor;
    at least one non-transitory computer readable medium in communication with the at least one processor;
    at least one display in communication with the at least one processor and the at least one non-transitory computer readable medium;
    at least one program module, stored on the at least one medium, and operative upon execution by the at least one processor to:
    import contacts from at least one social media;
    monitor the at least one social media for at least one communication associated with each contact;
    determine an importance value for each contact based at least in part on an amount of communications associated with each contact;
    rank the contacts based at least in part on the importance value associated with each contact; and
    display on the at least one display the contacts based at least in part on the ranking of the contacts, wherein displaying the contacts comprises:
    displaying a name for each contact and the importance value determined for each contact, and displaying, a name of a company associated with each contact in the event a company is associated with each contact, a number of social media sources, a number of emails sent to each contact for a given period of time, a number of emails received from each contact for the given period of time, and a date of the last sent email or a date of the last received email.

11. The electronic device of claim 10, further comprising adjusting the importance value for each contact based on a type of at least one monitored communication.

12. The electronic device of claim 10, further comprising adjusting the importance value for each contact based on information contained within at least one monitored communication.

13. The electronic device of claim 10, wherein the at least one social media includes social networks comprising email accounts, LinkedIn®, Facebook®, Twitter®, and Chatter®.

14. The electronic device of claim 10, wherein determining the importance value comprises determining at least one numerical value.

15. The electronic device of claim 14, wherein the importance value includes a fixed value based on the at least one social media being monitored.

16. The electronic device of claim 14, wherein the importance value is periodically adjusted based on each email exchange with the contact.

17. An electronic device, comprising:
at least one processor;
at least one non-transitory computer readable medium in communication with the at least one processor;
at least one display in communication with the at least one processor and the at least one non-transitory computer readable medium;
at least one program module, stored on the at least one medium, and operative upon execution by the at least one processor to:
import contacts from at least one social media;
receive from a remote source, an importance value for each contact based at least on an amount of communications associated with each contact;
receive from a remote source, a ranking of the contacts based on an importance value associated with each contact; and
display on the at least one display the contacts based on the ranking of the contacts, wherein displaying the contacts comprises:
displaying a name for each contact and the importance value for each contact, and
displaying, a name of a company associated with each contact in the event a company is associated with each contact, a number of social media sources, a number of emails sent to each contact for a given period of time, a number of emails received from each contact for the given period of time, and a date of the last sent email or a date of the last received email.

* * * * *